United States Patent [19]

Schools

[11] Patent Number: 5,028,165
[45] Date of Patent: Jul. 2, 1991

[54] CORNER CONNECTION FOR FRAMES FOR DOUBLE GLAZING AND PROFILES HEREBY APPLIED

[75] Inventor: Leo Schools, Brecht, Belgium

[73] Assignee: Atlas Isolaties, personenvennootschap met be-perkte aansprakelijkheid, Brecht-Sint Lenaarts, Belgium

[21] Appl. No.: 413,104

[22] Filed: Sep. 27, 1989

[30] Foreign Application Priority Data

Sep. 28, 1988 [BE] Belgium .................. 8801104

[51] Int. Cl.$^5$ .................. B25G 3/36
[52] U.S. Cl. .................. 403/402; 403/403; 403/295; 403/267
[58] Field of Search .................. 403/267, 401, 402, 295, 403/266, 403; 52/172, 656

[56] References Cited

U.S. PATENT DOCUMENTS

| | | | |
|---|---|---|---|
| 1,832,078 | 11/1931 | Zahner et al. | 403/402 |
| 3,606,419 | 9/1971 | Virkler et al. | 287/189.36 H |
| 4,145,150 | 3/1979 | Rafeld | 403/402 X |
| 4,222,213 | 9/1980 | Kessler | 52/790 |
| 4,453,855 | 6/1984 | Richter | 403/402 X |
| 4,530,195 | 7/1985 | Leopold | 403/401 X |
| 4,551,364 | 11/1985 | Davies | 52/172 X |

FOREIGN PATENT DOCUMENTS

| | | |
|---|---|---|
| 0228641 | 8/1987 | European Pat. Off. . |
| 0255510 | 2/1988 | European Pat. Off. . |
| 8402718 | 4/1987 | Fed. Rep. of Germany . |
| 2253936 | 7/1975 | France . |
| 1443953 | 7/1976 | United Kingdom . |
| 2001380 | 1/1979 | United Kingdom . |

Primary Examiner—Andrew V. Kundrat
Attorney, Agent, or Firm—Foley & Lardner

[57] ABSTRACT

Corner connection for frames for double glazing, characterized in that it principally consists of two hollow profiles (1) to be connected to each other and a corner profile (20) of which the arms can be placed in open cavities (4) of the profiles (1) and that has a sealing wall (23) between the arms (21-22) which after joining together the profiles (1) seals the closed hollows (3) of the profiles (1).

19 Claims, 2 Drawing Sheets

CORNER CONNECTION FOR FRAMES FOR DOUBLE GLAZING AND PROFILES HEREBY APPLIED

BACKGROUND OF THE INVENTION

1. Field of the Invention

This invention relates to a corner connection for frames for double glazing, on the one hand, as well as to profiles used for realizing such frames, on the other hand.

2. Breif Description of Prior Art

It is known that double glazing can principally be realized in two ways namely, either by joining together two or more sheets of glass with the insertion of a frame, mostly in aluminum, or by installing one or more glass panels next to an existing mostly single glazing likewise with the insertion of a frame.

It is likewise known that such frames are formed by hollow profiles which are connected to each other at the placed in the hollow profiles in order the obtain a connection at a suitable angle.

Generally such a connection will form an angle of 90 degrees.

A difficulty found in realizing such frames is that the necessary sealing at the corners often leaves something to be desired.

It has therefore already been proposed to provide the arms of the corner profiles with a soft or relatively soft material, such as for example tin, lead, glue, bitumen or similar so that during the insertion of the arms of the corner profile in the hollow profiles already connected together to obtain a first seal between these profiles and the corner profile, on the one hand, and between the adjacent profile extremities, on the other hand, by scraping off the excess of material that is applied to the corner profile, after which possibly an additional seal is obtained by warming at least the corners of such frame joined together with the intention of melting the aforementioned soft or relatively soft material and letting it penetrate into the possible space still between the profiles and the corner profile.

All these corner connections have as common disadvantage that the arms of the corner profiles penetrate into the cavity of the profiles to be joined together through which the extremities of these profiles, have to be accurately pushed against each other to place the material applied to the corner profile between these extremities and thus to ensure the seal of the profiles in question, at their extremities.

SUMMARY AND OBJECT OF THE PRESENT INVENTION

The present invention has as an object a corner connection which can be realized in a very simple manner with maximum security regarding the seal of the corner connection.

For this purpose the corner connection according to the invention consists of two hollow profiles to be connected to each other and a corner profile of which the arms can be placed in open cavities of the profiles and that has a sealing wall between the arms which after joining together the profiles seals the closed hollows of the profiles.

In the simplest embodiment the sealing wall of the corner profile will seal off the open extremity of the adjacent profiles to joined to each other whereby, through possible additional warming of the corner connection, a seal is obtained because the material, that is generally provided on the side walls of such frame profiles, usually bitumen, fills the spaces around the aforementioned sealing wall between the adjacent profiles to be joined to each other.

In a particular embodiment, either the aforementioned sealing wall, or the aforementioned sealing wall and at least a part of the arms of the corner connection can be provided with a material such as mentioned above, namely tin, lead, bitumen, etc. in order to obtain a sealing of the corner connection thus already by the insertion of the arms of the corner profile in the cavities of the profiles to be joined to each other which is completed after complete insertion of the arms of the corner profile.

BRIEF DESCRIPTION OF THE DRAWINGS

In order to show better the characteristics according to the present invention, a preferred embodiment is described hereafter, as example and without any restrictive character, with reference to the enclosed drawings, in which.

DETAILED DESCRIPTION OF THE PREFERRED EMBODIMENT

Figure 1:
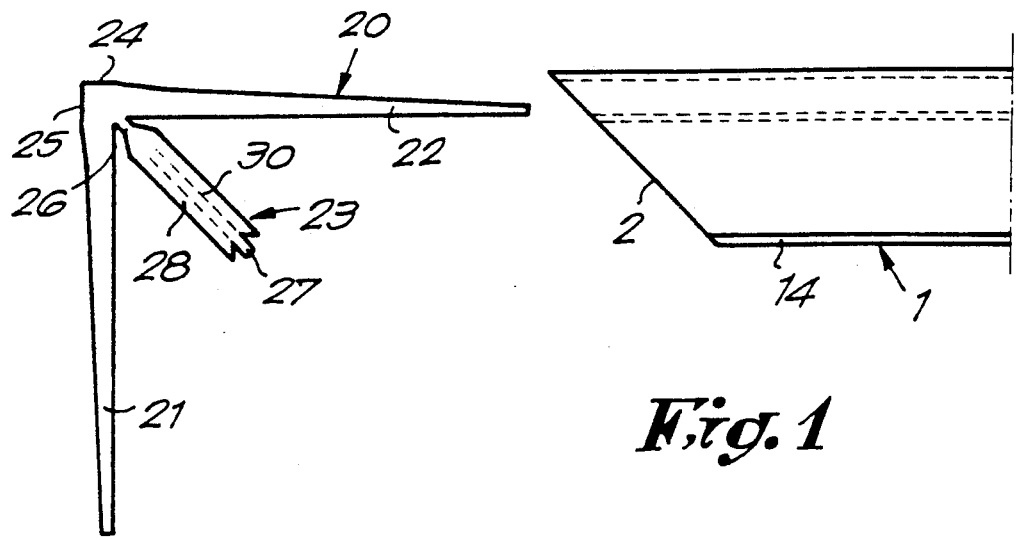
FIG. 1 shows an exploded view of a corner connection according to the invention.
Figure 1:
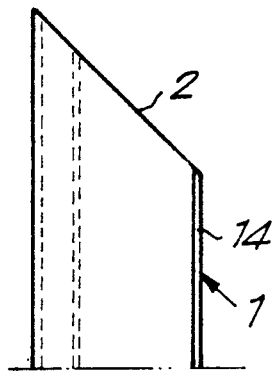

In FIG. 1 two similar profiles 1 to be connected at an angle of 90 degrees in relation to each other are shown. These profiles are provided with a cut away 2 on the extremities facing each other which forms an angle of 45 degrees in relation to the longitudinal direction of the profile 1. Each profile according to the invention consists of a closed cavity 3, on the one hand, and above this closed cavity 3 an open cavity 4, on the other hand.

The closed cavity 3 shows a lower wall 5; two side walls 6, 7 and an upper wall 8 whereby this upper wall also forms lower wall of the open space 4 which is further completed by side walls, respectively 9 and 10 which as it were form an extension of the aforementioned walls 6 and 7 and flanges 11 and 12 which are provided with the walls 9 and 10 on the free extremities and which are directed towards each other and parallel with the aforementioned wall 8.

In the wall 5, over the whole length, small holes 13 are provided. The wall 5 extends out on the sides of the walls 6 and 7 and there forms ribs 14, 15.

Furthermore the walls 6–9 and 7–10 are each provided on their outer side with a quantity of bitumen or similar 16–17 which is provided with a covering strip 18–19, of which it is later the intention among others, after removing the strips 18 and 19, to make a sealing contact with the sheets of glass not shown in the drawings.

The connection of the profiles 1 according to the invention is obtained by means of a corner profile 20 that consists of arms, respectively 21, 22 which in this case are placed at an angle of 90 degrees and that, have a sealing wall 23 in the corner where these arms 21 and 22 come together which is placed at an angle of 45 degrees in relation to the aforementioned arms. In this embodiment the arms 21 and 22 are produced conically in order to simplify their insertion into the profile 1 whereby these arms, at the position where they meet each other, show a thickness which is equal or almost equal to the corresponding measurement of the open cavity 4 of the profile 1 in which the arms 21 and 22 are installed. These thickened places are indicated by 24, 25 in the drawings.

The aforementioned sealing wall 23 in this case is so achieved that it shows two relatively thin parts, respectively 26 and 27, on its terminal edges which will act as stop for the cut off extremities 2 of the profiles 1, while the body 28 of the sealing wall 23 is produced thicker and, after installation of the profile 1 over the arms of the corner profile 20, fits into the closed cavity 3 of the profiles 1.

In order to connect two such profiles to each other it is sufficient to place them to over the arms 21 and 22 of a corner profile 20 whereby these profiles 1, when they lie with their walls 5 and 8 against the sealing wall 23, more especially against the parts 26 and 27 of these, preferably fit tightly into the open cavities 4 at the location of the thickened places 24 and 25 of the corner profile 20.

Through the open character of the cavity 4 it is achieved that during this insertion of the arms 21 and 22 the flanges 11 and 12 of the cavity 4 can yield somewhat if this should appear necessary.

Figure 2:
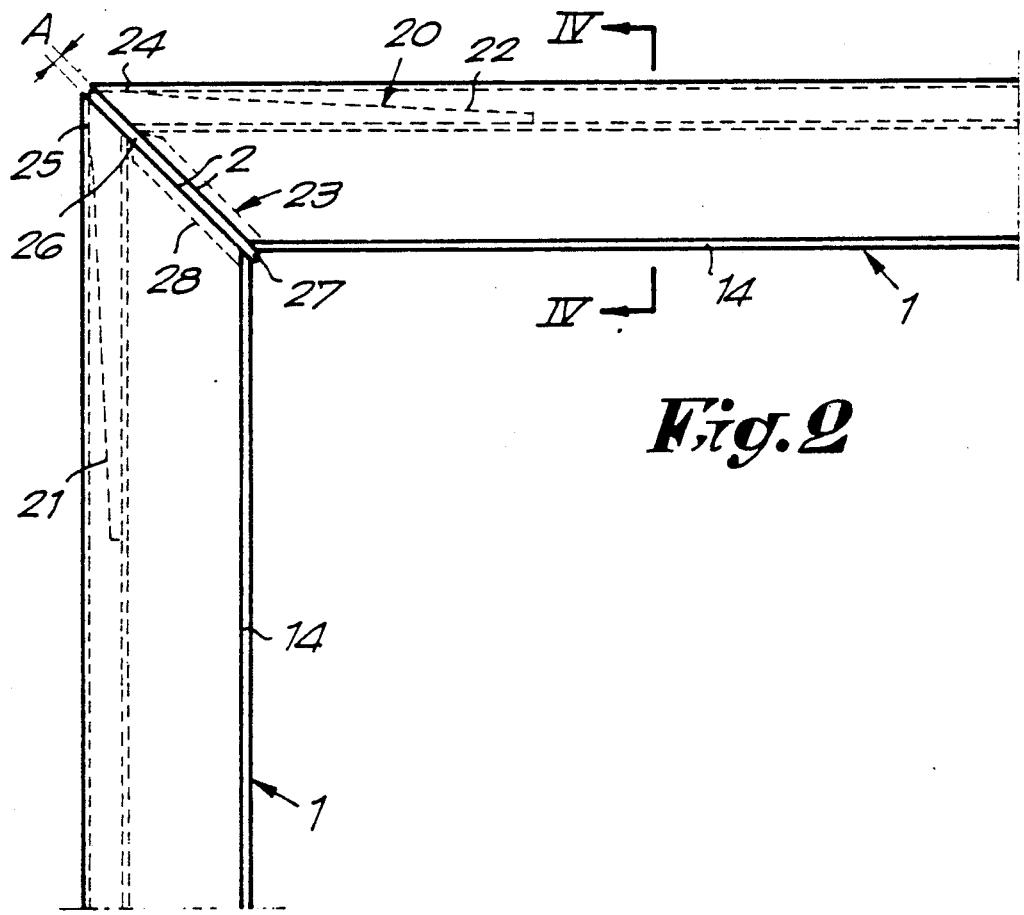
FIG. 2 shows a similar view to that from FIG. 1 but after the actual corner connection is realized.
Figure 3:
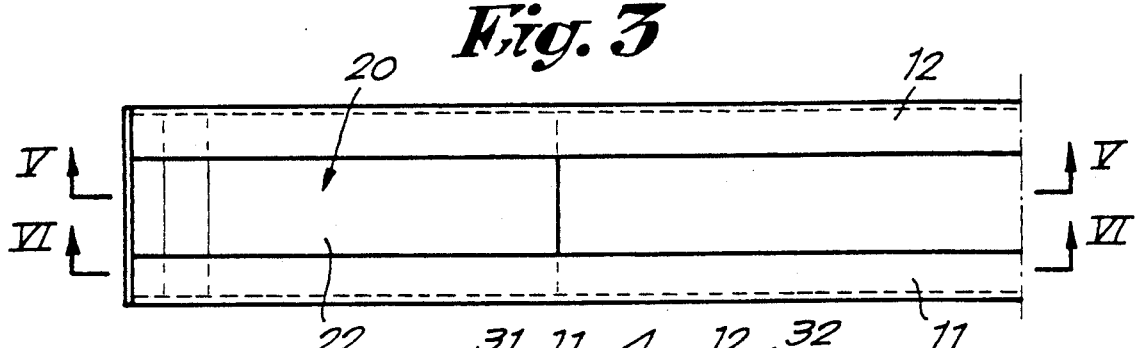
FIG. 3 shows a top view of FIG. 2.
Figure 4:
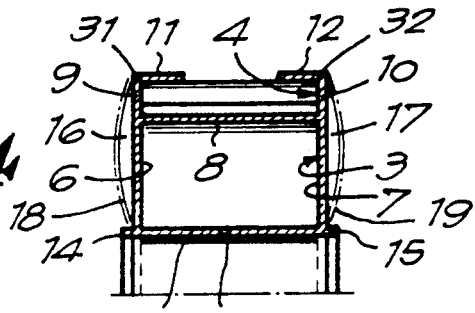
FIG. 4 shows a cross-section according to line IV—IV in FIG. 2.
Figure 5:
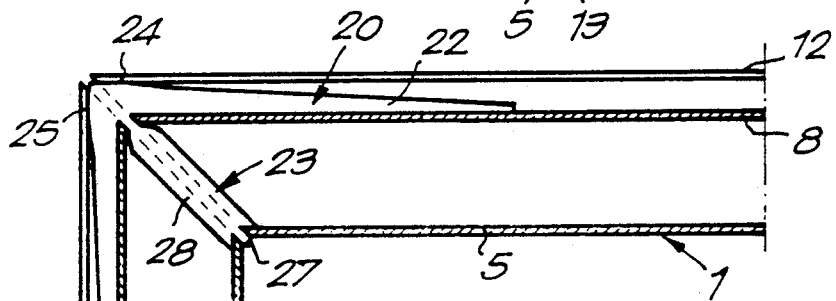
FIGS. 5 and 6 respectively show cross-sections according to line V—V and VI—VI in FIG. 3.
Figure 6:
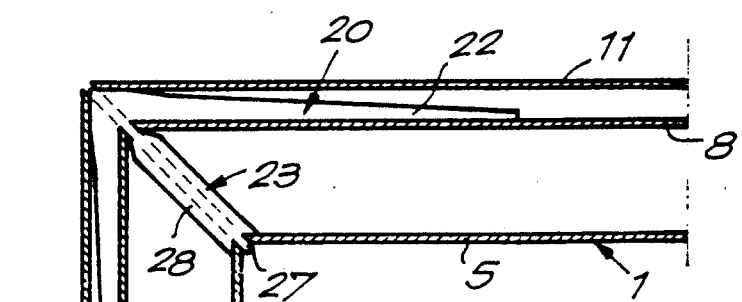

When the profiles 1 are thus secured in relation to each other, as shown in FIG. 2, a distance A will obviously remain in existence between the cut off edges 2 of these profiles which is equal to the thickness of the parts 26 and 27.

Since the width of the corner element 20 is equal to the internal distance between the walls 9 and 10 of the cavity 4; the thickened parts 24 and 25 of the corner profile 20 are equal to the internal distance between the wall 8 and the flanges 11, 12; the parts 26 and 27 of the corner element 20 are placed between the adjacent walls 8, on the one hand, and 5, on the other hand, and finally the thickened part 28 of the sealing wall 23 is placed in the adjacent extremities of the closed cavity 3 of the profiles 1, in this manner not only an efficient connection is obtained between two profiles 1, but at the same time an efficient sealing of the extremities of these profiles 1.

When such joined together profiles 1 are subsequently warmed, at least at the location of the corner connection, the material 16, 17 will melt somewhat and thus fill the space A between the profiles 1 through which an additional seal is obtained.

Notwithstanding a very good seal is already achieved in the manner described above such a seal can of course still be improved by at least providing the sealing wall 23 and possibly at least a part of the arms 21 and 22 of the corner profile 20 with a covering which can be formed by a soft metal, such as tin, lead or similar, a glue, a plastic, bitumen, or similar, through which not only an additional seal is obtained during the insertion of the arms 21 and 22 in the open cavities 4 of two profiles 1, but whereby this seal becomes maximally efficient when at the same time at least at the location of the corner connection, heat is applied to allow the aforementioned covering to fill all possible remaining spaces.

It is clear that in this case the drying agent that in the known manner is confined in the closed cavities 3 remains completely dry since, for one thing, a good seal is formed on the corners of the frame obtained, this of course on condition that the customary temporary strip 29 which is provided over the holes 13 has not yet been removed.

It is clear that it is not necessary that the arms 21 and 22 of the corner profile 20 are produced conically.

Neither is it necessary that the sealing wall 23 shows a thickening 28. Indeed this sealing wall 23, as is schematically shown in FIG. 1 by means of dotted line 30, could show the same thickness over the whole length.

Through the fact that the arms 21 and 22 of the corner profile 20 are not located in the closed cavities 3 of the profiles 1 it is clear that the frame that is produced in this manner can contain more drying agent than is the case when, as usual up until now, the arms of the corner profile are located in these cavities 3.

Likewise it is achieved by placing the arms 21, 22 of the corner profile 20 outside the cavities 3 and providing a sealing wall 23, that the outer corner formed by the connection of the walls 8 with the part 26 of the sealing wall 23 as it were becomes an inner corner through which the seal is also improved.

In order to make the mutual adjustment of the corner profile 20 even more adjustable in the open cavities 4 weakenings may possibly be provided in the inner corners 31 and 32 between the walls 9-10 and the flanges 11-12 through which these lips 11 and 12 become more transformable, respectively adjustable.

A corner profile 20 according to the invention also further allows that it is easily transformable through which the arms of this can be placed at almost any angle when frames would have to be formed of which the angles are different from 90 degrees.

Through the design of the profile 1 it is also further obtained that the groove formed between the flanges 11 and 12 of it, which allows access to the open profile 4 can be applied to connect such frames with an additional construction, either by sliding in fixing elements in such cavity 4 beforehand, or by installing already known fixing elements which can block after rotation in such cavity 4.

In a particular application according to the invention implemented frames can be applied in glass walls and similar.

Finally the corner profile 20, and/or the profiles 1, can be implemented in metal, for example aluminum, or in a suitable plastic, whereby in this last case, in order to limit the permeability in the open cavity 4, preferably an impermeable covering is provided against the wall 8.

It is clear that the present invention is in no way restricted to the embodiment described as example and shown in the drawings, but may be developed in all kinds of forms and dimensions.

I claim:

1. A corner connection for frames for double glazing, comprising:
   a pair of hollow frames profiles for connection with each other, each profile having a first cavity and a second cavity; and
   a corner profile comprising a pair of arms, one arm being inserted into the first cavity of one frame profile and the other arm being inserted into the first cavity of the other frame profile, and a sealing wall positioned between the arms, for tightly sealing the second cavities of the frame profiles at free ends thereof.

2. A corner connection according to claim 1 wherein the second cavity is closed, and the first cavity is open and positioned on top of the second cavity.

3. A corner connection for frames for double glazing, comprising:
   pair of hollow frame profiles for connection with each other, each profile having a first open cavity positioned outside of a second closed cavity; and
   a corner profile comprising a pair of arms, one arm being inserted into the first cavity of one frame profile and the other arm being inserted into the first cavity of the other frame profile, and a sealing wall positioned between the arms, for sealing the second cavities of the frame profiles;
   wherein each second cavity comprises:
   (a) a first pair of sides;
   (b) a lower wall between the sides;
   (c) an upper wall between the sides;
   and wherein each first cavity comprises:
   (a) a second pair of saides, the second sides being extensions of the first sides;
   (b) the upper wall between the sides; and
   (c) a pair of flanges extending inwardly from free ends of the second sides.

4. A corner connection according to claim 3, wherein the lower wall extends outwardly from the first sides to form a pair of ribs.

5. A corner connection according to claim 3, wherein the second cavity further comprises a pair of inner corners formed between the second sides and the flanges, these corner being weaker than the second sides and the flanges.

6. A corner connection according to claim 3, wherein the first sides and second sides are provided with a layer of bitumen.

7. A corner connection according to claim 3, wherein the corner profile has a width approximately equal to the distance between the first sides and the second sides.

8. A corner connection according to claim 3, wherein at least the sealing wall and at least a part of the arms are covered with a soft material, 9. A corner connection according to claim 8, wherein the soft material is a soft metal.

10. A corner connection according to claim 8, wherein the soft material is glue.

11. A corner connection according to claim 8, wherein the soft material is plastic.

12. A corner connection according to claim 8, wherein the soft material is bitumen.

13. A corner connection according to claim 1, wherein the sealing walls forms a stop for an upper wall and a lower wall of each of the frame profiles.

14. A corner connection for frames for double glazing, comprising:
   a pair of hollow frame profiles for connection with each other, each profile having a first cavity and a second cavity; and
   a corner profile comprising a pair of arms, one arm being inserted into the first cavity of one frame profile and the other frame profile, and a sealing wall positioned between the arms, for sealing the second cavities of the frame profiles;
   wherein the arms increase in thickness towards each other, each arm having a thickness approximately equal to the distance between the upper wall and the flanges at an end of the arm where they join together.

15. A corner connection for frames for double glazing, comprising:
   a pair of hollow frame profiles for connection with each other, each profile having a first cavity and a second cavity; and
   a corner profile comprising a pair of arms, one arm being inserted into the first cavity of one frame profile and the other arm being inserted into the first cavity of the other frame profile, and a sealing wall positioned between the arms, for sealing the second cavities of the frame profiles;
   wherein the sealing wall has a pair of thin parts, the sealing wall being thicker between the thin parts and, after inserting the arms into the frame profiles, fits into the second cavities of the adjacent frame profiles.

16. A method of connecting corners of frames for double glazing, said method comprising the steps of;
   providing a pair of hollow frame profiles, each profile having a first cavity and a second cavity formed therein;
   providing a corner profile comprising a pair of arms and a sealing wall extending between said arms;
   inserting one arm into the first cavity of one frame profile;
   inserting the other arm into the first cavity of the other frame profile; and
   tightly sealing the free ends of the second cavities of the frame profiles with said sealing wall.

17. A method according to claim 16, further comprising the step of covering a said sealing wall and at least one part of the arms with a soft material before inserting the arms of the corner profile into the first cavities of the hollow profiles.

18. A method according to claim 17, wherein said soft material is glue.

19. A method according to claim 16, wherein said step of providing said sealing wall comprises providing a sealing wall having a pair of thin parts and a thicker part located between the thin parts, and wherein said step of sealing the cavities of the frame profiles comprises the step of fitting the thicker part of said sealing wall between the second cavities of aid frame porfilios.

* * * * *